United States Patent [19]

Houdeshell

[11] 4,287,911

[45] Sep. 8, 1981

[54] THREE SPEED FLUID FLOW CONTROL VALVE

[76] Inventor: Donald D. Houdeshell, 1647 N. Township Rd., R.R. #2, Republic, Ohio 44867

[21] Appl. No.: 172,152

[22] Filed: Jul. 25, 1980

[51] Int. Cl.³ .............................................. F15B 13/04
[52] U.S. Cl. .................................. 137/513.7; 91/443; 137/514.7; 137/599
[58] Field of Search .................. 91/443; 137/504, 498, 137/513.7, 514.7, 599

[56] References Cited

U.S. PATENT DOCUMENTS

| | | | |
|---|---|---|---|
| 586,561 | 7/1897 | Mosher | 137/513.7 X |
| 3,072,107 | 1/1963 | Cassell | 91/443 |
| 3,085,589 | 4/1963 | Sands | 137/498 |
| 4,147,179 | 4/1979 | Miura | 137/599 |

FOREIGN PATENT DOCUMENTS 1020504 12/1957 Fed. Rep. of Germany ... 137/513.7

Primary Examiner—Robert G. Nilson
Attorney, Agent, or Firm—Harvey B. Jacobson

[57] ABSTRACT

A control valve body is provided for series connection in a fluid flow control line in which alternating fluid flow in opposite directions at different speeds is desired. The body has a main flow passage formed therethrough and also includes a by-pass passage by-passing a central portion of the main flow passage. Throttle valve structure is operatively associated with the by-pass passage to variably throttle the flow of fluid therethrough and a control valve is shiftably supported in the main flow passage central portion for movement between open and closed positions. Spring structure is provided for yieldingly biasing the control valve toward the open position thereof and the control valve includes a fluid impact portion disposed in the central portion of the main flow passage for fluid impact pressure thereon to shift the control valve toward its closed position against the spring structure which yieldingly biases the control valve toward its open position responsive to fluid flow through the main passage in the direction in which the fluid flow is to be reduced. Dashpot structure is operatively connected between the body and the control valve for varying the closing rate of the control valve.

8 Claims, 2 Drawing Figures

THREE SPEED FLUID FLOW CONTROL VALVE

BACKGROUND OF THE INVENTION

There are instances wherein air or hydraulic cylinders of considerable length are used to control various mechanisms. In some of these instances while rapid extension or retraction of a fluid motor is desired retraction or extension of the same fluid motor in the opposite direction at a slower rate may be desired. Accordingly, various different forms of multi-speed control valves heretofore have been operatively associated with fluid cylinders. However, many of these multi-speed control valves are extremely complex in nature and "over engineered" in order to accomplish a relatively simple task. Accordingly, a need exists for a more simplified and reliable multi-speed control valve operative to allow extension and retraction of associated fluid cylinders at different speeds. Examples of various forms of previously known multi-speed control valves as well as other similar structures are disclosed in U.S. Pat. Nos. 2,749,937, 3,117,591, 3,122,162, 3,460,569, 3,561,471 and 4,147,179.

BRIEF DESCRIPTION OF THE INVENTION

The control valve of the instant invention is constructed in a manner whereby substantially unrestricted flow therethrough is afforded in one direction and immediate reverse flow therethrough is allowed at substantially the same rate and then gradually throttled to a predetermined slow rate. By this construction cylinders of extremely long stroke may be operated at full speed in one direction and at substantially full speed throughout initial movement in the opposite direction while thereafter being gradually reduced in speed until a final predetermined slow speed near the end of the stroke of the cylinder in the opposite direction is achieved.

The main object of this invention is to provide an improved control valve for controlling the extension and retraction of fluid cylinders.

Another object of this invention is to provide an improved control valve which will be operative to effect three speed operation of an associated cylinder or group of cylinders with the three speeds including a full speed operation in one direction, substantially initial immediate full speed operation in the opposite direction and thereafter gradually decreasing speed until a final slow speed of movement is achieved prior to termination of the stroke of the associated piston or pistons in the opposite direction.

Yet another important object of this invention is to provide a multi-speed control valve including simplicity of design.

Another important object of this invention is to provide a multi-speed control valve in accordance with the preceding objects and including structure whereby the final slow speed operation of the associated cylinder may be readily adjusted.

A further important object of this invention in accordance with the immediately preceding object is to provide a control valve including structure whereby the time interval of decelerating speed of operation of the associated cylinder may be readily adjusted.

A final object of this invention to be specifically enumerated herein is to provide a multi-speed control valve in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
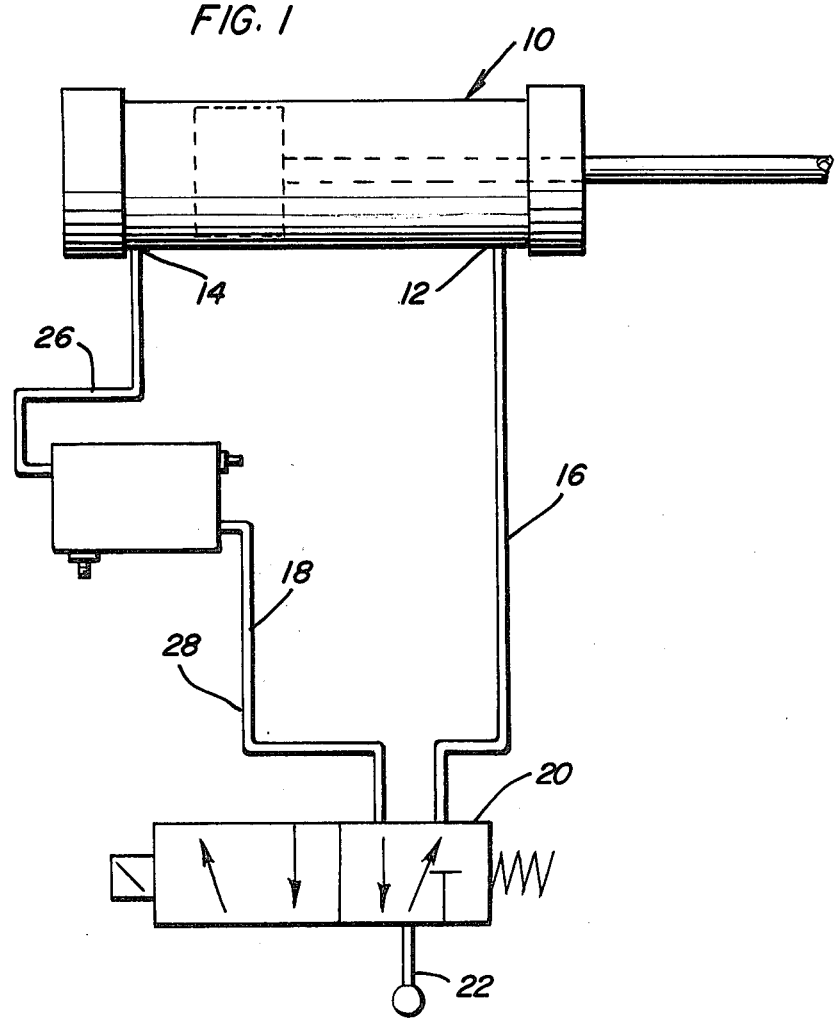
FIG. 1 is a schematic view illustrating the control valve of the instant invention operatively connected within a loop-type fluid circuit having a hydraulic cylinder serially connected therein and with the loop circuit having a solenoid actuating reversing valve operatively connected thereto.

Referring now more specifically to the drawings the numeral 10 generally designates a conventional form of extendible and retractable hydraulic cylinder including the usual opposite end ports 12 and 14 to which combined supply and return lines 16 and 18 are operatively connected. A solenoid controlled reversing valve 20 is operatively connected to the lines 16 and 18 and serves to alternately communicate the lines 16 and 18 with a source 22 of fluid under pressure and to vent the other line to a suitable reservoir (not shown).

The control valve of the instant invention is referred to in general by the reference numeral 24 and is serially connected in the line 18 thereby dividing line 18 into opposite end portions 26 and 28.

The control valve 24 includes a body 30 including a main flow passage 32 formed therethrough. The opposite ends of the main flow passage 32 are internally threaded as at 34 and 36 whereby the adjacent ends of the end portions 26 and 28 may be threadedly connected to the body 30 in communication with the main flow passage 32. The main flow passage 32 is Z-shaped in configuration including two oppositely outwardly opening parallel end portions 38 and 40 interconnected by a lateral portion 42. The end portion 38 opens into the adjacent end of the lateral portion 42 through a conical valve seat 44 defined in the body 30 and a by-pass passage 46 by-passes the central portion of the main flow passage 32 comprising the lateral portion 42 and the valve seat 44. The by-pass passage defines a needle valve seat 48 with which a needle valve 50 threadingly supported from the body 30 as at 52 is operatively engaged. A sealing ring 54 is operatively associated with the needle valve 50 and the body 30 and the needle valve 50 includes a tapered head 56 which may be moved toward and away from engagement with the seat 48, the end of the needle valve 50 remote from the head 56 being disposed exteriorly of the body 30 and provided with a screwdriver engageable slot 58 whereby adjustment of the needle valve 50 from the exterior of the body 30 may be readily effected.

Figure 2:
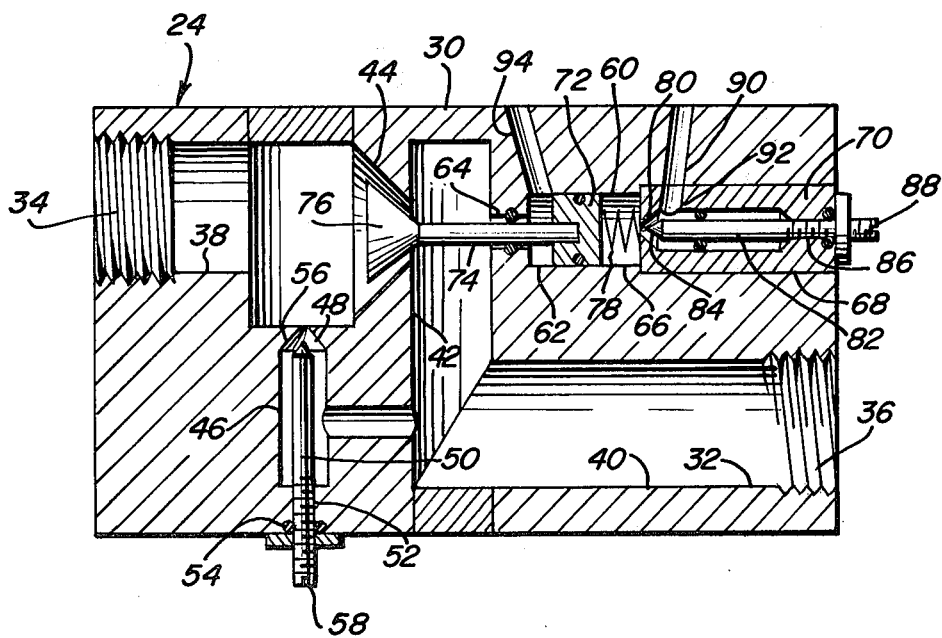
FIG. 2 is an enlarged sectional view of the control valve.

The body 30 includes a cylinder bore 60 formed therein aligned with the valve seat 44 and including a first end 62 communicated with the lateral portion 42 via a small diameter port 64 coaxial with the bore 60. The second end 66 of the bore 60 opens into an enlarged counterbore 68 in which a cylindrical valve body 70 is secured and a seal equipped piston 72 is reciprocal in the bore 60 and includes a piston rod portion 74 sealingly received through the port 64 and having a tapered valve head 76 on its end remote from the piston 72 movable into and out of engagement with the valve seat 44 for closing the same. A compression spring 78 is disposed within the cylinder bore 60 between the piston 72 and the valve body 70 and yieldingly biases the piston 72 toward the left as viewed in FIG. 2 and thereby yieldingly biases the head 76 toward an open position out of engagement with the valve seat 44.

The valve body 70 defines a needle valve seat 80 opening thereinto and the valve body 70 supports a needle valve 82 therefrom including a head 84 movable toward and away from the seat 80. The needle valve 82 is threadedly supported from the valve body 70 as at 86 and includes an exterior slotted end 88 which also may be engaged by a screwdriver for ready adjustment of the needle valve 82 from the exterior of the body 30. The second end 66 of the cylinder bore 60 is vented through the needle valve seat 80 and a lateral port 90 formed in the valve body 30 and opening into the interior of the valve body 70 through a lateral port 92 formed in the valve body 70 and aligned with the port 90. In addition, the first end 62 of the cylinder bore 60 is vented through a lateral port 94 formed in the body 30.

In operation, during extension of the cylinder 10 fluid flows into the cylinder 10 through the valve 24 and from the cylinder 10 through the line 16. The fluid flows into the end portion 40 of the main flow passage 32 and as pressure builds up in the lateral passage 42 the head 76 is unseated from the seat 44 as the piston 72 moves to the left in bore 60 toward the first end of the bore 60 vented through the port 94. Thus, rapid fluid flow is enabled through the main flow passage 32 via the lateral passage 42 and the open valve seat 44. In addition, some additional fluid flow is realized through the by-pass passage 46. When the reversing valve 20 is actuated to reverse the flow of fluid into and from the cylinder 10, fluid under pressure enters the end portion 38 of the main fluid passage 32 and impinges upon the head 76 in order to bias the head 76, the rod 74 and the piston 72 to the right against the biasing action of the spring 78. Thus, initial movement of fluid through the main flow passage 32 from the cylinder 10 is allowed at a full rate of speed but is soon gradually throttled as the piston 72 moves to the right in the bore 76 against the biasing action of the spring. Further, the needle valve 82 throttles the needle valve seat 80 and thus controls movement of the piston 72 to the right as viewed in FIG. 2. After the valve head 76 has engaged the seat 44, the low rate of flow of fluid through the main flow passage 32 and by-pass passage 46 is established and all further fluid flowing through the body 30 must pass through the seat 48 and around the head 56 of the needle valve 58 assuring slow final retraction movement of the piston of the hydraulic cylinder 10.

Thus, valve 24 comprises a three speed valve which allows high speed operation of the cylinder 10 in one direction, initial high speed operation of the cylinder in the opposite direction, subsequent gradually reducing speed of operation and thereafter final slow speed operation of the cylinder 10 in the opposite direction.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A control valve for series connection in a fluid flow control line in which alternating fluid flow in opposite directions at different speeds is desired and with the fluid flow in one direction being allowed at a substantially constant high rate and the fluid flow in the opposite direction is initially allowed at generally the same rate and is thereafter gradually throttled to a slower flow rate, said valve including a body having a main flow passage therethrough and a by-pass passage therein by-passing a central portion of said main flow passage, throttle means operative to adjustably throttle the fluid flow rate through said by-pass passage, and control valve means in said main flow passage central portion supported from said body for shifting between open and closed positions allowing fluid flow therepast at a rate slightly slower than said high rate in said one direction and at least substantially terminating fluid flow therepast in said closed position, means yieldingly biasing said control valve to said open position, said control valve including a fluid impact portion disposed in said central portion of said main flow passage for fluid impact pressure thereon to shift said control valve toward said closed position against said means biasing said control valve toward said open position, and adjustable rate movement dashpot means operatively connected between said body and control valve operative to vary the closing rate of said control valve.

2. The combination of claim 1 wherein said dashpot means also includes means operative to slightly restrict movement of said control valve from said closed position to the open position thereof.

3. The combination of claim 1 wherein said dashpot means includes a cylinder bore in said body and a piston slidable in said bore and operatively connected to said control valve for reciprocation in said bore responsive to shifting of said control valve between the open and closed positions thereof, said body including a pair of vent passages communicating with the opposite ends of said bores, and a variable throttle valve member carried by said body and operatively associated with one of said vent passages for controlling the fluid flow rate therethrough.

4. The combination of claim 3 wherein said means yieldingly biasing said control valve toward the open position thereof includes spring means operatively connected between said body and piston and disposed in the end of said bore with which said one vent passage is communicated.

5. The combination of claim 4 wherein said dashpot means also includes means operative to slightly restrict movement of said control valve from said closed position to the open position thereof.

6. The combination of claim 1 wherein said throttle valve includes a threadingly supported needle valve adjustable from the exterior of said body.

7. The combination of claim 6 wherein said dashpot means includes a cylinder bore in said body and a piston slidable in said bore and operatively connected to said control valve for reciprocation in said bore responsive to shifting of said control valve between the open and closed positions thereof, said body including a pair of vent passages communicating with the opposite ends of said bores, and a variable throttle valve member carried by said body and operatively associated with one of said vent passages for controlling the fluid flow rate therethrough.

8. The combination of claim 7 wherein said variable throttle valve member includes a second threadingly supported needle valve adjustable from the exterior of said body.

* * * * *